United States Patent
Sugita (10) Patent No.: US 6,542,495 B1
(45) Date of Patent: Apr. 1, 2003

(54) WIRELESS COMMUNICATING METHOD, WIRELESS COMMUNICATING SYSTEM, COMMUNICATING STATION, AND CONTROLLING STATION

(75) Inventor: Takehiro Sugita, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/264,243

(22) Filed: Mar. 8, 1999

(30) Foreign Application Priority Data

Mar. 17, 1998 (JP) ......................................... P10-066791

(51) Int. Cl.[7] .............................................. H04J 15/00
(52) U.S. Cl. ....................................... 370/347; 370/468
(58) Field of Search ................................ 370/337, 347, 370/328, 329, 431, 442, 461, 462, 466, 468, 443, 280, 252, 254, 338, 345, 349

(56) References Cited

U.S. PATENT DOCUMENTS

| | | | | |
|---|---|---|---|---|
| 4,727,539 A | * | 2/1988 | Arita et al. ................... | 370/461 |
| 5,311,510 A | * | 5/1994 | Moriue et al. ............... | 370/428 |
| 5,329,531 A | | 7/1994 | Diepstraten et al. ........ | 370/94.2 |
| 5,357,525 A | * | 10/1994 | Moriue et al. ............... | 370/360 |
| 5,384,777 A | * | 1/1995 | Ahmadi et al. ............... | 370/337 |
| 5,499,247 A | * | 3/1996 | Matsuda et al. ............. | 370/445 |
| 5,517,489 A | * | 5/1996 | Ogura ........................... | 370/223 |
| 5,784,365 A | * | 7/1998 | Ikeda ........................... | 370/337 |
| 5,818,825 A | * | 10/1998 | Corrigan et al. ............. | 370/329 |
| 5,907,544 A | * | 5/1999 | Rypinski ...................... | 370/337 |
| 6,097,707 A | * | 8/2000 | Hodzic et al. ............... | 370/321 |
| 6,466,587 B1 | * | 10/2002 | Sugaya ......................... | 370/468 |

FOREIGN PATENT DOCUMENTS

| | | | |
|---|---|---|---|
| EP | 0932277 | 7/1999 | ........... H04L/12/28 |
| EP | 0939523 | 9/1999 | ........... H04L/12/64 |
| EP | 0948166 | 10/1999 | ........... H04L/12/28 |
| WO | 9747112 | 12/1997 | ........... H04L/12/28 |

* cited by examiner

Primary Examiner—William Trost
Assistant Examiner—Conguan Tran
(74) Attorney, Agent, or Firm—Jay H. Maioli (57) ABSTRACT

A wireless communicating method of a system having a plurality of communicating stations and a controlling station for causing the communicating stations to be accessed. A communication signal is transmitted between each of the communicating stations and the controlling station, the communication signal being structured as a frame divided as time periods of a control area and a data area. The controlling station transmits a communicating station state signal to each of the communicating stations and each of the communicating stations transmits a communicating station state change request signal to the controlling station so as to cause the controlling station to control access right of the communicating station corresponding to a priority level assigned to the communicating station.

12 Claims, 8 Drawing Sheets

| #1 | WN1 |
|----|-----|
| #2 | WN2 |
| #3 |     |
| #4 | WN4 |
| #5 | WN5 |
| #6 | WN6 |
| ⋮  | ⋮   |

Fig. 8

| #1 | WN1 |
|----|-----|
| #2 | WN2 |
| #3 | WN1 |
| #4 | WN3 |
| #5 | WN1 |
| #6 | WN4 |
| ⋮  | ⋮   |

WIRELESS COMMUNICATING METHOD, WIRELESS COMMUNICATING SYSTEM, COMMUNICATING STATION, AND CONTROLLING STATION

BACKGROUND OF THE INVENTION

1. Field of the Invention

The present invention relates to a wireless communicating method, a wireless communicating system, a communicating station, and a controlling station suitable for wirelessly transmitting chronologically continuous data streams (such as digital audio data and digital video data) and asynchronous data (such as commands) between for example digital audio units or between digital video units.

2. Description of the Related Art

Audio units and video units have been digitized as with for example CD (Compact Disc) players, MD (Mini Disc) recorders/players, digital VCRs, digital cameras, and DVD (Digital Versatile Disc) players. As personal computers have become common, systems that connect such digital audio units or digital video units to personal computers have been proposed. As an interface that accomplishes a system that connects such digital audio units or such digital video units to a personal computer, IEEE (Institute of Electronics Engineers) 1394 is becoming attractive.

The IEEE 1394 interface supports both an isochronous transmission mode and an asynchronous transmission mode. The isochronous transmission mode is suitable for transmitting chronologically continuous data streams such as video data and audio data at high speed. The asynchronous transmission mode is suitable for transmitting various commands and files. Since the IEEE 1394 interface supports both the isochronous transmission mode and the asynchronous transmission mode, when the IEEE 1394 interface is used, video data and audio data can be transmitted between digital audio units and between digital video units, respectively. With a personal computer connected to such digital units through the IEEE 1394 interface, the user can easily control and edit video data and audio data.

The IEEE 1394 interface is a wired interface. To structure such a system with a wired interface, cable connections are required. In addition, such cable connections tend to become complicated. Moreover, with a wired interface, it is difficult to connect units that are disposed in different rooms.

Thus, a digital audio unit or a digital video unit and a personal computer are connected with a wireless LAN (Local Area Network) so as to wirelessly communicate therebetween. As examples of the wireless LAN, CSMA (Carrier Sense Multiple Access) method and polling method are known.

However, in the conventional CSMA method and polling method, data streams such as video data and audio data cannot be transmitted at high speed. To solve such a problem, as with IEEE 1394, a wireless LAN that supports both an isochronous transmission mode that allows data streams such as video data and audio data to be transmitted at high speed and an asynchronous transmission mode that allows asynchronous data such as commands and files to be transmitted has been developed.

When data is wirelessly transmitted between units through the wireless LAN, it is preferable to assign a priority level to transmission data so as to allow data to be transmitted with priority corresponding to the assigned priority level. For example, when parameters are exchanged in the initial setting state, it is desired that a response to a parameter should be promptly sent back. In this case, the priority level is raised so as to perform a communication with priority.

In the polling method, by varying the frequency of acquisition of communication right, a priority level can be assigned. Particularly, in a polling communication, since a controlling station manages access right, a priority level can be easily and securely assigned.

However, when a communicating station need to transmit data in emergency, even if it changes the priority level, it cannot transmit a priority level change request to the controlling station in the case that the communication system gets congested.

OBJECTS AND SUMMARY OF THE INVENTION

Therefore, an object of the present invention is to provide a wireless communicating method, a wireless communicating system, a communicating station, and a controlling station that allow access right of each communicating station to be easily changed and controlled corresponding to a priority level assigned thereto.

A first aspect of the present invention is a wireless communicating method of a system having a plurality of communicating stations and a controlling station for causing the communicating stations to be accessed, comprising the steps of transmitting a communication signal between each of the communicating stations and the controlling station, the communication signal being structured as a frame divided as time periods of a control area and a data area, causing the controlling station to transmit a communicating station state signal to each of the communicating stations, causing each of the communicating stations to transmit a communicating station state change request signal to the controlling station so as to cause the controlling station to control access right of the communicating station corresponding to a priority level assigned to the communicating station.

A second aspect of the present invention is a wireless communicating system, comprising a plurality of communicating stations, and a controlling station for causing the communicating stations to be accessed, wherein a communication signal is transmitted between each of the communicating stations and the controlling station, the communication signal being structured as a frame divided as time periods of a control area and a data area, wherein the controlling station transmits a communicating station state signal to each of the communicating stations, and wherein each of the communicating stations transmits a communicating station state change request signal to the controlling station so as to cause the controlling station to control access right of each of the communicating stations corresponding to a priority level assigned to each of the communicating stations.

A third aspect of the present invention is a communicating station of a wireless communicating system having a plurality of communicating stations and a controlling station for causing the communicating stations to be accessed, a communication signal being transmitted between each of the transmitting stations and the controlling station and structured as a frame divided as time periods of a control area and a data area, comprising a communicating station state change request signal transmitting means for transmitting a communicating station state change request signal that causes a priority level of each of the communicating stations to be changed, and a communicating station state signal receiving means for receiving the communicating station state signal from the controlling station, wherein the priority level of each of the communicating stations is updated, the communicating station transmits the communicating station state change request signal to the controlling station, receives the communicating station state signal from the controlling station, and acknowledges that the priority level has been updated.

A fourth aspect of the present invention is a control station of a wireless communicating system having a plurality of communicating stations and a controlling station for causing the communicating stations to be accessed, a communication signal being transmitted between each of the transmitting stations and the controlling station and structured as a frame divided as time periods of a control area and a data area, comprising a communicating station state change request signal receiving means for receiving a communicating station state change request signal from each of the communicating stations, the communicating station state change request signal causing a priority level of each of the communicating stations to be changed, a communicating station state signal transmitting means for transmitting a communicating station state signal that causes the state of each of the communicating stations to be set corresponding to the communicating station state change request signal, and a controlling means for controlling access right corresponding to the priority level of each of the communicating stations, wherein after the controlling station receives the communicating station state change request signal from each of the communicating stations, the controlling station transmits the communicating station state signal corresponding to a requested priority level and changes the access right of each of the communicating stations corresponding to a priority level assigned thereto.

A communication signal transmitted and received between each communicating station and a controlling station is structured as frames each of which is divided into a time period of a control area and a time period of a data area. In the control area, a communicating station state signal and a communicating station state change request signal are placed. The communicating station state signal represents the priority level of the local communicating station. The communicating station state change request signal causes the priority level of the local communicating station to be changed. In such a manner, the control area and the data area are chronologically divided. In addition, the controlling station transmits the communicating station state signal to the communicating station and the communicating station transmits the communicating station state change request signal to the controlling station so that the controlling station controls the access right of the communicating station corresponding to the priority level assigned thereto. Thus, in any case, the priority level of each communicating station can be securely assigned.

These and other objects, features and advantages of the present invention will become more apparent in light of the following detailed description of a best mode embodiment thereof, as illustrated in the accompanying drawings.

DETAILED DESCRIPTION OF THE PREFERRED EMBODIMENTS

Figure 1:
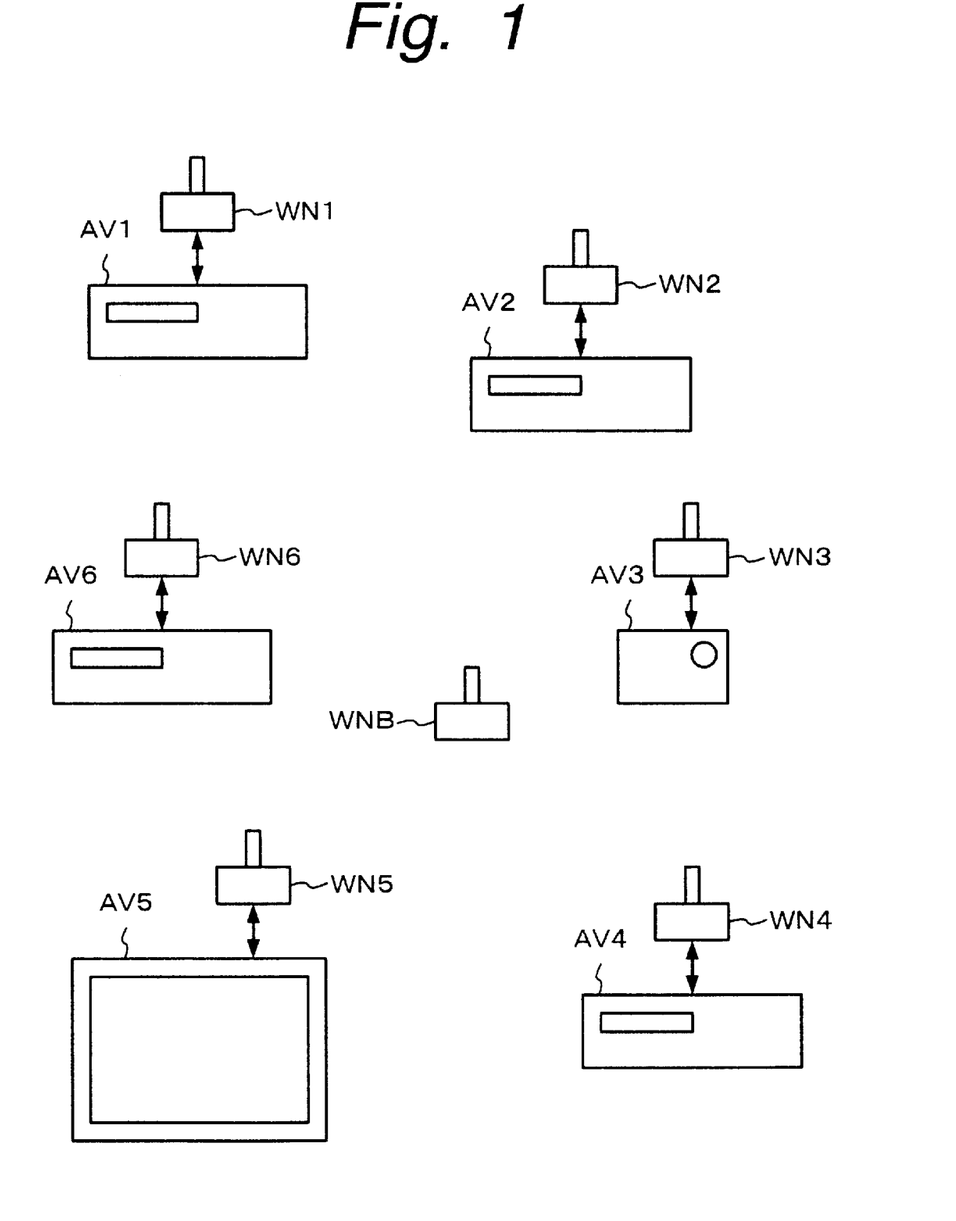
FIG. 1 is a schematic diagram showing an example of a wireless network system according to the present invention.

Next, with reference to the accompanying drawings, an embodiment of the present invention will be described. According to the present invention, as with the IEEE 1394 interface, a system that wirelessly transmits a data stream (such as video data or audio data) and asynchronous data (such as commands) is structured. FIG. 1 shows an outline of such a wireless network system.

In FIG. 1, WN1, WN2, WN3, . . . are wireless nodes as peripheral communicating stations. Digital audio units or digital video units AV1, AV2, . . . , such as a CD player, an MD recorder/player, a digital VCR, a digital camera, a DVD player, and a television receiver can be connected to the wireless nodes WN1, WN2, . . . In addition, a personal computer can be connected to the wireless nodes WN1, WN2, WN3, . . . Each of the digital audio units and digital video units AV1, AV2, . . . connected to the wireless nodes WN1, WN2, . . . has the IEEE 1394 digital interface. The wireless nodes WN1, WN2, . . . and the digital audio units and digital video units AV1, AV2, . . . are connected with the IEEE 1394 digital interface.

WNB is a wireless node as a controlling station. The wireless node WNB as the controlling station exchanges control data with the wireless nodes WN1, WN2, . . . as the communicating stations. The wireless nodes WN1, WN2, . . . as the communicating stations communicate with each other under the control of the wireless node WNB as the controlling station. The wireless nodes WN1, WN2, . . . as the communicating stations wirelessly exchange chronologically continuous data streams (isochronous data) and asynchronous data such as commands.

Figure 2:
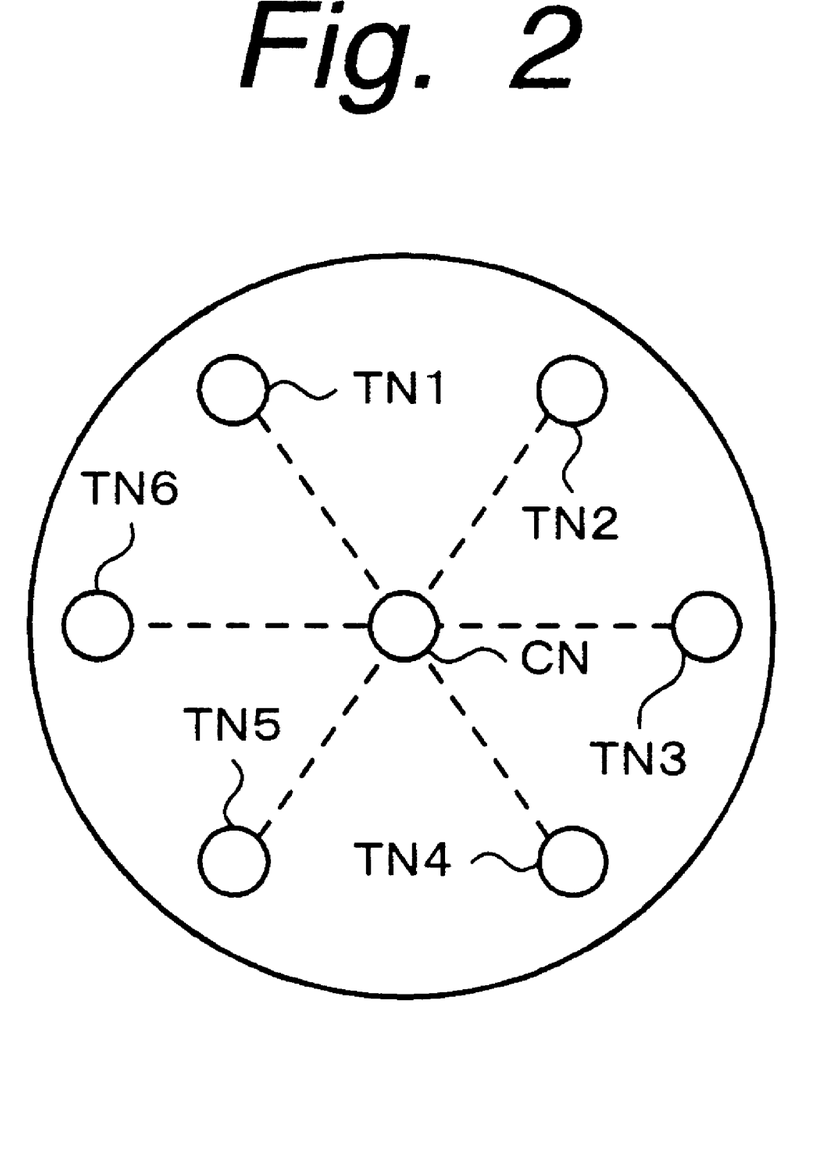
FIG. 2 is a schematic diagram for explaining a star type network system.

In this example, as shown in FIG. 2, a star type topology wireless LAN is structured. In the star type topology, the wireless LAN is composed of a central controlling station CN and peripheral terminal stations TN1, TN2, . . . The terminal stations TN1, TN2, . . . exchange data under the control of the central controlling station CN. The central controlling station CN corresponds to the wireless node WNB. The terminal stations TN1, TN2, . . . correspond to the wireless nodes WN1, WN2, . . . It should be noted that the structure of the wireless LAN is not limited to such a star type topology.

Control data, chronologically continuous data streams such as audio data and video data, and asynchronous data such as commands are transmitted between the wireless nodes WN1, WN2, . . . and the wireless node WNB. These types of data are transmitted as frames as shown in FIG. 3.

Figure 3:
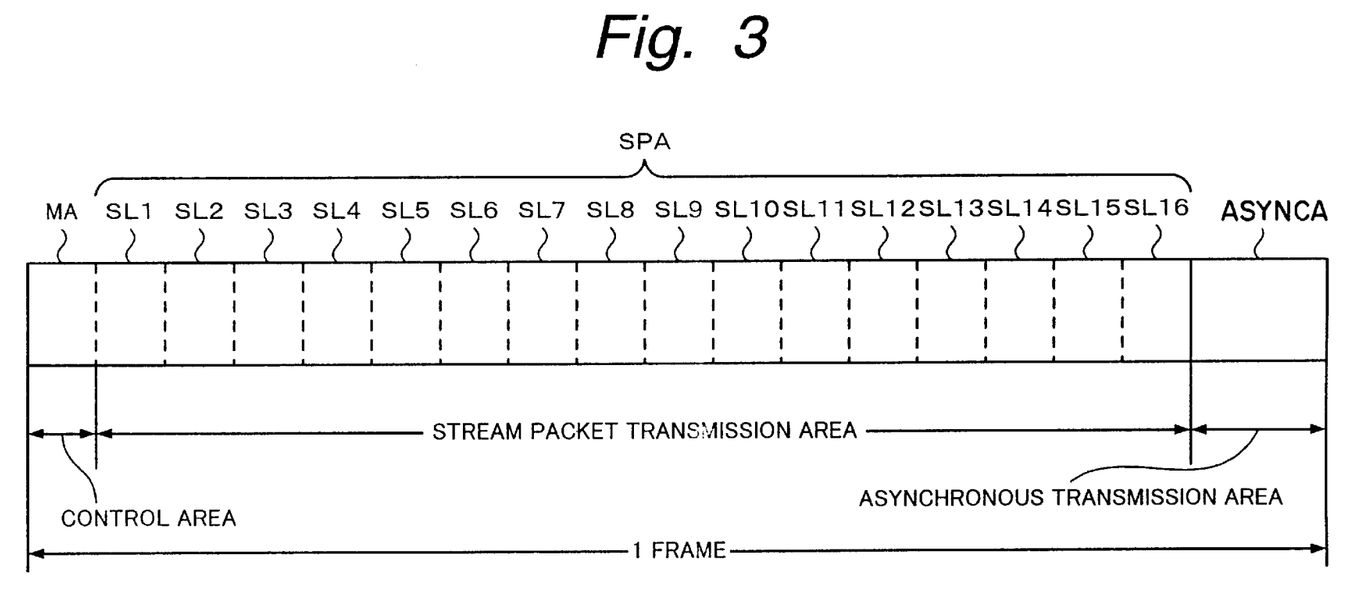
FIG. 3 is a schematic diagram for explaining the structure of one frame in the wireless network system.

In other words, FIG. 3 shows a frame structure of data transmitted between the wireless node WN1, WN2, . . . and the wireless node WNB. As shown in FIG. 3, at the beginning of one frame, a control area MA for management information such as network information is placed. The control area MA is followed by a stream packet transmission area SPA and an asynchronous transmission area ASYNCA. The stream packet transmission area SPA and the asynchronous transmission area ASYNCA compose a data transmission area.

The stream packet transmission area SPA is used for a high speed communication equivalent to the isochronous transmission mode of the IEEE 1394 interface. The stream packet transmission area SPA is composed of time slots SL1, SL2, . . . The time slots SL1, SL2, . . . are units of which data is time-division multiplexed. The time slots are placed at intervals of a predetermined time period. In this example, the number of the time slots SL1, SL2, . . . is 16. With different time slots SL1, SL2, . . . , for example 16 data streams can be transmitted in the same system at a time.

In the above-described example, the number of time slots is 16. However, it should be noted that the number of time slots is not limited to 16. In addition, the time slots may be placed at any positions of a frame.

In the stream packet transmission area SPA, data streams are transmitted with the time slots SL1, SL2, . . . At this point, the number of time slots SL1, SL2, . . . used for one data stream is not constant. For example, the bit rate of an MPEG (Moving Picture Experts Group) 2 data stream varies corresponding to its pattern or its motion. When the information amount of a data stream is large, the number of time slots SL1, SL2, . . . used for one data stream becomes large. In contrast, when the information amount of a data stream is small, the number of time slots SL1, SL2, . . . used for one data stream becomes small.

In the stream packet transmission area SPA, since data is transmitted at high speed, a data re-transmitting operation cannot be performed. Thus, an error correction code corresponding to block encoding method is added to the data to correct an error thereof.

The asynchronous transmission area ASYNCA is equivalent to the asynchronous transmission mode of the IEEE 1394 interface. Thus, the asynchronous transmission area ASYNCA is used for asynchronous data such as commands. When data in the asynchronous transmission area ASYNCA is transmitted, for an error-free transmission, an acknowledgment signal sent back from the remote party is checked. When an acknowledgment signal is not received, a data re-transmitting operation is performed.

As a transmission controlling method in the asynchronous transmission area ASYNCA, the wireless node WNB as the central controlling station polls the wireless nodes WN1, WN2, . . . as the communicating stations or detects carrier signals therefrom so as to prevent transmission requests from colliding on a transmission path.

When data streams are transmitted between the wireless nodes WN1, WN2, . . . , the time slots SL1, SL2, . . . are allocated by the wireless node WNB as the controlling station.

In other words, the wireless node WNB as the controlling station manages a communication state of the system and recognizes time slots that are being used. In addition, the wireless node WNB as the controlling station transmits management area information. With the management area information, each of the wireless node WN1, WN2, . . . can determine what time slots SL1, SL2, . . . are being used for what data streams.

Figure 4:
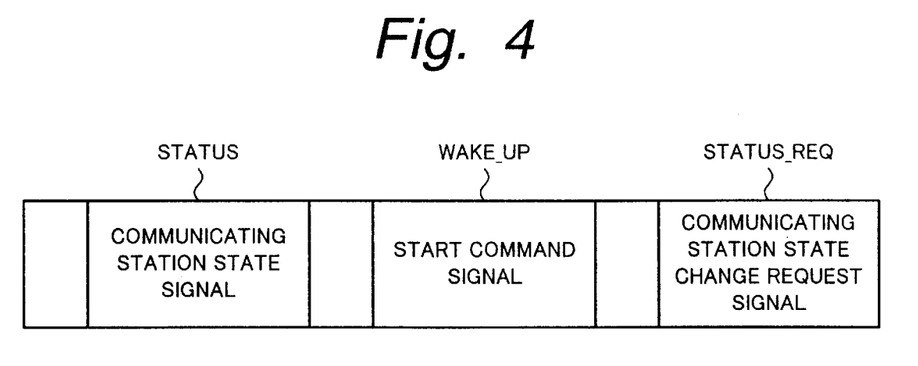
FIG. 4 is a schematic diagram for explaining the structure of a control area.

The wireless node WNB as the controlling station polls the wireless nodes WN1, WN2, . . . as the communicating stations. When the wireless node WN1, WN2, . . . have issued data stream transmission requests through the polling operation, they are transmitted to the wireless node WNB as the controlling station. The wireless node WNB as the controlling station allocates the time slots SL1, SL2, . . . to the wireless nodes WN1, WN2, . . . that have issued the data transmission requests. In addition, the wireless node WNB as the controlling station transmits information of the newly allocated time slots SL1 , SL2, . . . to the other wireless nodes WN1, WN2, . . . The wireless nodes WN1, WN2, . . . that have been requested for the data tra nsmiss ion transmit data streams to the r emote stations with the allocated time slots SL1, SL2, In this example, as shown in FIG. 4, the control area MA at the beginning of each frame has a communicating station state signal STATUS, a start command signal WAKE-UP, and a communicating station state change request signal STATUS_REQ. The communicating station state signal STATUS, the start command signal WAKE-UP, and the communicating station state change request signal STATUS_REQ are used to control sleep state and high priority state of the wireless nodes WN1, WN2, . . . of the system.

The communicating station state signal STATUS represents the state of the local communicating station. The wireless node WNB as the controlling station periodically transmits the communicating station state signal STATUS. The communicating station state signal STATUS represents for example three states of sleep state, normal state, and high priority state. When the value of the communicating station state signal STATUS is "00", it represents the sleep state. When the value of the communicating station state signal STATUS is "01", it represents the normal state. When the value of the communicating station state signal STATUS is "10", it represents the high priority state.

The sleep state represents that the local wireless node is not communicating. In the sleep state, each of the wireless nodes WN1, WN2, . . . is in sleep mode. In the sleep mode, since only limited circuits operate, the power consumption is very small. Even in the sleep mode, each wireless node can receive at least the start command signal WAKE-UP so as to restore the normal state. When the wireless nodes WN1, WN2, . . . are in the sleep state, since they are not communicating, the wireless node WNB as the controlling station does not poll them.

The normal state represents that the local wireless node is normally operating. When the wireless nodes WN1, WN2, . . . are in the normal state, the controlling station WNB usually polls them.

The high priority state represents that the wireless node WNB as the controlling station exchanges parameters with the wireless nodes WN1, WN2, . . . in initializing mode. When the wireless nodes WN1, WN2, . . . are in the high priority state, the wireless node WNB as the controlling station more frequently polls the wireless nodes WN1, WN2, . . . than those in the normal state.

The start command signal WAKE_UP causes the communicating stations WN1, WN2, . . . to cancel the sleep state. When the wireless nodes WN1, WN2, . . . that are in the sleep state receive the start command signal WAKE_UP, they cancel the sleep state and enter the normal state.

The communicating station state change request signal STATUS_REQ is transmitted so as to change the current state. The communicating station state change request signal is transmitted from the wireless nodes WN1, WN2, . . . as the communicating stations. When the wireless nodes WN1, WN2, . . . as the communicating stations that are in the normal state enter the sleep state, they transmit the communicating station state change request signal STATUS_REQ to the wireless node WNB as the controlling station so as to enter the sleep state.

Figure 5:
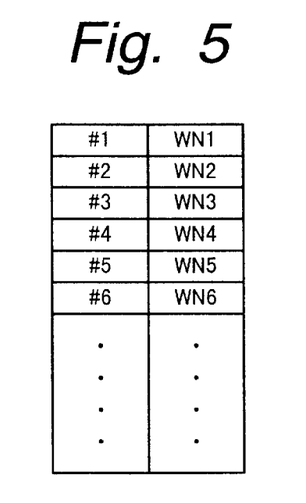
FIG. 5 is a schematic diagram for explaining a polling list.

In this example, the wireless node WNB as the controlling station polls the wireless nodes WN1, WN2, . . . as the communicating stations. As shown in FIG. 5, the wireless node WNB as the controlling station has a polling list. The wireless node WNB as the controlling station polls the wireless nodes WN1, WN2, . . . corresponding to the polling list.

Figure 6:
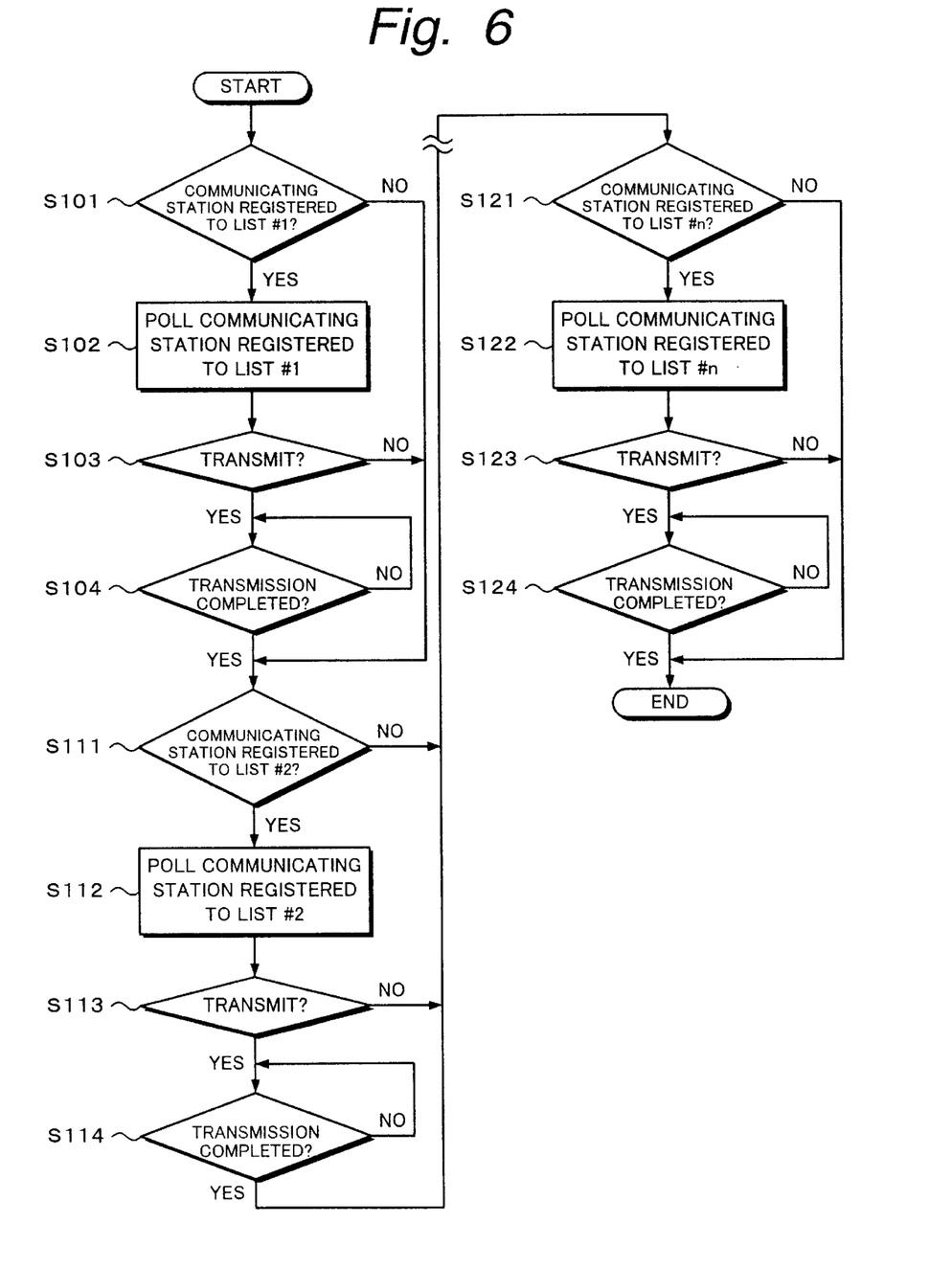
FIG. 6 is a flow chart for explaining a polling accessing operation.

FIG. 6 is a flow chart showing a polling process performed by the controlling station. In FIG. 6, the wireless node WNB determines whether or not a wireless node has been registered to list number #1 (at step S101). When the determined result at step S101 is Yes, the wireless node WNB polls the wireless node registered to the list number #1 (at step S102). Thereafter, the wireless node WNB determines whether the wireless node registered to the list number #1 transmits a reply signal to the wireless node WNB (at step S103). When the determined result at step S103 is Yes, the wireless node WNB determines whether or not the transmission of the reply signal has been completed (at step S104). When the determined result at step S104-is Yes, the wireless node WNB performs the polling process for the next node. When the determined result at step S101 is No, the wireless node WNB performs the polling process for the next node.

Thereafter, the wireless node $WNB_4$ determines whether or not a wireless node has been registered to list number #2 (at step Slll). When the determined result at step Slll is Yes, the wireless node WNB polls the wireless node registered to the list number #2 (at step S112). Thereafter, the wireless node WNB at determines whether or not the wireless node registered to the list number #2 transmits a reply signal (at step S113). When the determined result at step S113 is Yes, the wireless node WNB determines whether or not the transmission of the reply signal has been completed (at step S114). Thereafter, the wireless node performs the polling process for the next wireless node. When the determined result at step S111 is No, the wireless node WNB performs the polling process for the next node.

Thereafter, the wireless node WNB repeats the similar process. In other words, the wireless node WNB determines whether or not a wireless node has been registered to the last list number #n (at step S121). When the determined result at step S121 is Yes, the wireless node WNB polls the wireless node registered to the list number #n (at step S122). Thereafter, the wireless node WNB determines whether or not the wireless node registered to the list number gn transmits a reply signal (at step S123). When the determined result at step S123 is Yes, the wireless node WNB determines whether or not the transmission of the reply signal has been completed (at step S124). When the determined result at step S124 is Yes, the wireless node WNB completes the polling process. When the determined result at step S121 is No, the wireless node WNB completes the polling process.

With the polling list shown in FIG. 5, the wireless node WNB polls the wireless node WN1 registered to the list number #1 and the wireless node WN2 registered to the list number #2. Thereafter, corresponding to the polling list, the wireless node WNB polls the wireless nodes WN3, WN4, As described above, in the system according to the present invention, each wireless node can be set to one of the normal state, the sleep state, and the high priority state. In the normal state, the wireless node WNB successively polls the wireless nodes WN1, WN2, . . . When the wireless nodes WN1, WN2, . . . are set to the sleep state, the wireless node WNB does not poll them. When the wireless nodes WN1, WN2,. . . are set to the high priority state, the wireless node WNB more frequently polls the wireless nodes WN1, WN2, . . . than those in the normal state. The states of the wireless nodes WN1, WN2, . . . are controlled by changing the contents of the polling list.

Figure 7:
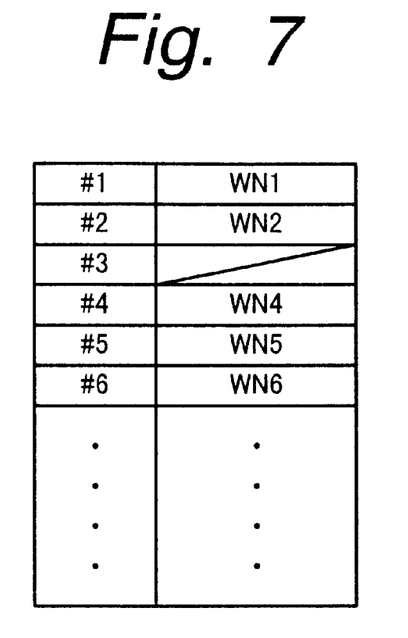
FIG. 7 is a schematic diagram for explaining a polling list in sleep state.

FIG. 7 shows the polling list in the case that the wireless node WN3 is set to the sleep state. As shown in FIG. 7, although the wireless nodes WN1 and WN2 have been registered to the list numbers #1 and #2, respectively, the wireless node WN3 has not been registered to the list number #3. With the polling list shown in FIG. 7, the wireless node WNB polls the wireless nodes WN1, WN2, and WN4, rather than the wireless node WN3. Thus, when the wireless node WN3 is set to the sleep state, the wireless node WN3 is removed from the polling list. Thus, the wireless node WNB does not poll the wireless node WN3.

Figure 8:
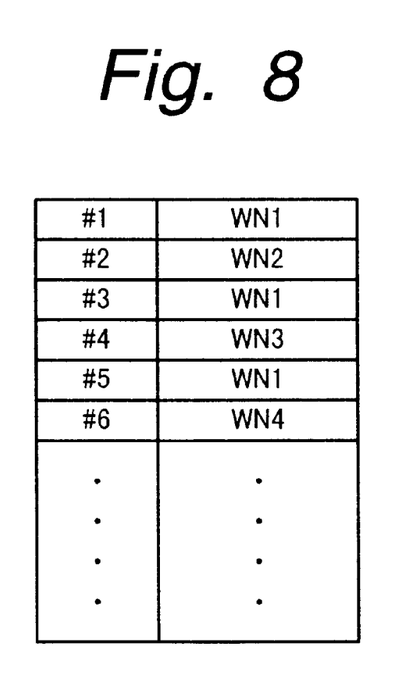
FIG. 8 is a schematic diagram for explaining a polling list in high priority state.

FIG. 8 shows the polling list in the case that the wireless node WN1 is set to the high priority state. In this case, as shown in FIG. 8, the wireless node WN1 has been registered to the list number #1. The wireless node WN2 has been registered to the list number #2. The wireless node WN1 has been registered to the list number #3. The wireless node WN3 has been registered to the list number #4. The wireless node WN1 has been registered to the list number #5. With the polling list shown in FIG. 8, the wireless node WNB successively polls the wireless nodes WN1, WN2, WN1, WN3, WN1, . . . In other words, the wireless node WNB polls the wireless node WN1 every other wireless node. Thus, when a particular wireless node is set to the high priority state, it is registered on the polling list a plurality of times. Thus, the wireless node WNB frequently polls the polling node that has been set to the high priority state.

In the above-described example, a wireless node that has been set to the high priority state is polled every another wireless node. However, the present invention is not limited to such a polling operation. Instead, a wireless node that has been set to the high priority state may be polled every two other wireless nodes or every three other wireless nodes. Alternatively, a wireless node that has been set to the high priority state may be successively polled a plurality of times.

Figure 9A:
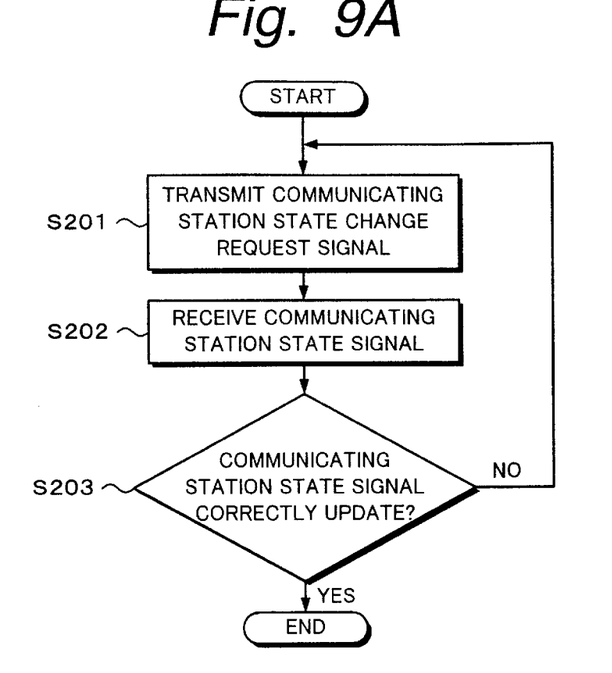
FIGS. 9A and 9B are flow charts for explaining a process in high priority state.
Figure 9B:
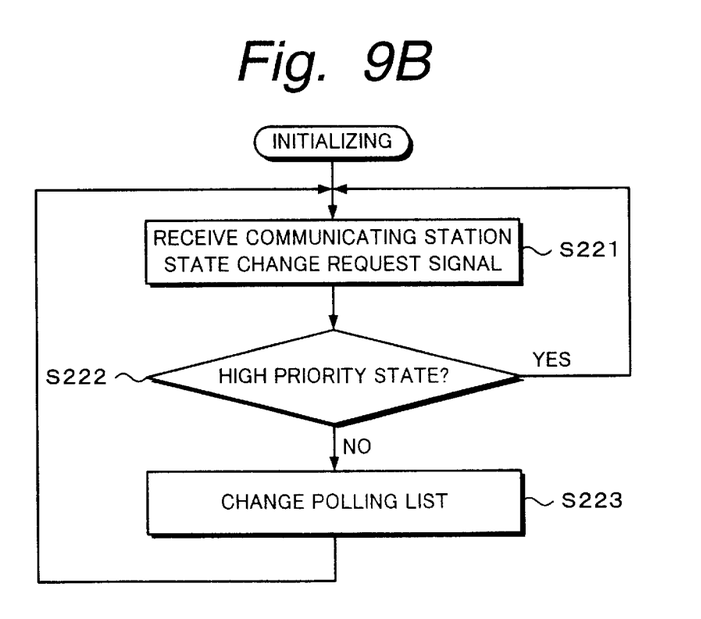

FIGS. 9A and 9B are flow charts showing a high priority state setting process that causes the wireless nodes WN1, WN2, . . . as the communicating stations to be set to the high priority state. FIG. 9A shows the high priority state setting process performed by the wireless nodes WN1, WN2, . . . as the communicating stations. FIG. 9B shows the high priority state setting process performed by the wireless node WNB as the controlling station.

In FIG. 9A, a wireless node as a communicating station transmits the communicating station state change request signal STATUS_REQ to the wireless node WNB as the controlling station so as to set the wireless node as the communicating station to the high priority state (at step S201).

When the wireless node WNB as the controlling station receives the communicating station state change request signal STATUS_REQ (at step S221), it determines whether or not the current state of the wireless node as the communicating station is the high priority state (STATUS_REQ= "10") (at step S222). When the determined result at step S222 is No, the wireless node WNB as the controlling station sets the wireless node as the communicating station to the high priority state and changes the polling list so that the number of times of the polling operation for the wireless node as the communicating station increases (at step S223). When the determined result at step S222 is Yes, the flow returns to step S221.

After the wireless node as the communicating station has transmitted the communicating station state change request signal STATUS_REQ to the wireless node WNB as the controlling station so as to place the wireless node as the communicating station to the high priority state, the wireless node as the communicating station receives the communicating station state signal STATUS (at step S202). The wireless node as the communicating station determines whether or not the communicating state signal STATUS has been correctly updated (at step S203). When the determined result at step S203 is Yes, the wireless node as the communicating station completes the process. When the determined result at step S203 is No, the flow returns to step S201. At step S201, the wireless node as the communicating station repeats the process.

In this system, the high priority state can be set in such a manner. A node that has been set to the high priority state is frequently polled than a node that has been set to the normal state. Thus, in the initial setting mode, when a node is set to the high priority state, data can be frequently exchanged.

Figure 10:
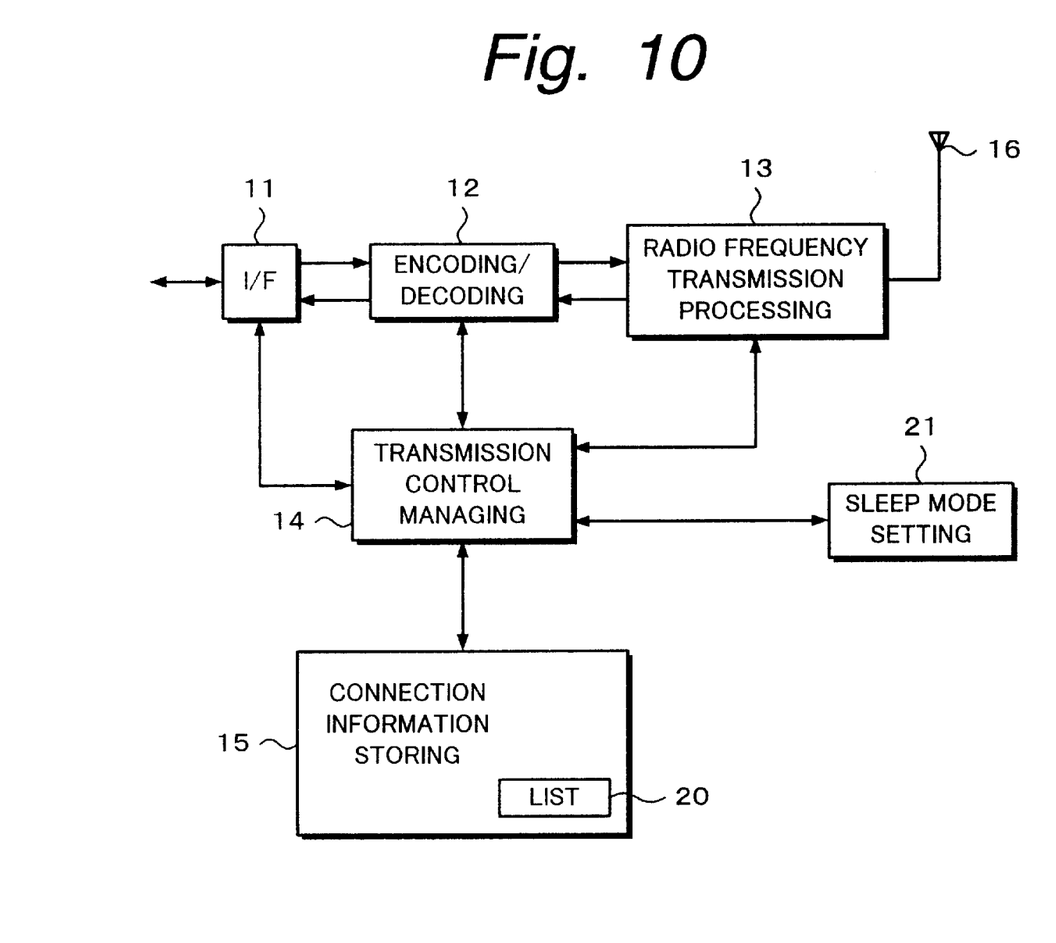
FIG. 10 is a block diagram showing an example of the structure of a wireless node of the wireless network system according to the present invention.

Next, the structure of each of the wireless nodes WN1, WN2, . . . and WNB will be described. FIG. 10 shows the structure of each of the wireless nodes WN1, WN2, . . . , and WNB. The structure of the wireless node WNB as the controlling station is basically the same as the structure of each of the wireless nodes WN1, WN2, . . . as the communicating stations.

As shown in FIG. 10, each of the wireless nodes WN1, WN2, . . . and WNB has an IEEE 1394 digital interface 11. The IEEE 1394 digital interface 11 supports chronologically continuous data (isochronous data) such as digital audio data and digital video data and asynchronous data such as commands.

In addition, each of the wireless nodes WN1, WN2, . . . WNB has an encoding/decoding portion 12, a radio frequency transmission processing portion 13, a transmission control managing portion 14, and a connection information storing portion 15.

The encoding/decoding portion 12 encodes transmission data and decodes reception data. When a data stream is transmitted, the encoding/decoding portion 12 performs an error correction code encoding process for the data stream with a block code. In addition, the encoding/decoding portion 12 performs the error correcting process for reception data.

The radio frequency transmission processing portion 13 modulates the transmission signal, converts the resultant signal into a signal of a predetermined frequency, amplifies the resultant signal in a desired power level, extracts a signal of a predetermined frequency from the reception signal, converts the resultant signal into a signal of an intermediate frequency, and demodulates the resultant signal. A variety of modulating methods have been proposed. Examples of the modulating methods are QPSK and multi-value QAM modulating method. Alternatively, the resultant data may be secondarily modulated by spectrum dispersing method or OFDM (Orthogonal Frequency Division Multiplexing) method.

The transmission control managing portion 14 manages the data transmission. In other words, as described above, in this system, data is transmitted as frames. Data streams such as digital video data are transmitted with time slots. When asynchronous data is transmitted, the transmission control managing portion 14 determines whether data has been transmitted corresponding to an acknowledgment signal. When data has not been transmitted, the transmission control managing portion 14 performs a re-transmitting operation.

The connection information storing portion 15 stores network connection information that represents what transmission uses what time slots. The connection information is transmitted and received as management area information. In addition, the connection information storing portion 15 stores the polling list 20. The polling list 20 is used when the wireless node WNB as the controlling station polls the wireless nodes WN1, WN2, . . . as the communicating stations.

Each of the wireless nodes WN1, WN2, . . . and WNB has a sleep mode setting portion 21. When the local wireless node is not used, the sleep mode setting portion 21 sets the node to the sleep mode. The sleep mode setting portion 21 determines whether or not the current node has operated for a predetermined time period. When the node has not operated for the predetermined time period, the sleep mode setting portion 21 sets the current node to the sleep mode. In the sleep mode, the power to circuits other than required circuits is stopped. In addition, the clock frequency is decreased. In the sleep mode, at a timing of the start command signal WAKE_UP in the control area MA at the beginning of each frame, a signal is received.

When management information is transmitted, control information is output from the transmission control managing portion 14 to the encoding/decoding portion 12. At a timing of the control area MA at the beginning of each frame, an output signal of the encoding/decoding portion 12 is supplied to the radio frequency transmission processing portion 13. The radio frequency transmission processing portion 13 modulates the signal in a predetermined modulating method, converts the resultant signal into a signal of a predetermined frequency, and amplifies the resultant signal in a desired power level. An output signal of the radio frequency transmission processing portion 13 is transmitted from the antenna 16.

When a data stream is transmitted, the data stream is supplied to the encoding/decoding portion 12 through the digital interface 11. The encoding/decoding portion 12 adds an error correction code as a block code to the data stream. Under the control of the transmission control managing portion 14, the data stream is allocated to predetermined time slots. In the time period of the allocated time slot, an output signal of the encoding/decoding portion 12 is supplied to the radio frequency transmission processing portion 13. The radio frequency transmission processing portion 13 modulates the signal in a predetermined modulating method, converts the signal into a signal of a predetermined transmission frequency, amplifies the resultant signal in a desired power level, and transmits the resultant signal from the antenna 16.

When asynchronous data is transmitted, the asynchronous data is supplied to the encoding/decoding portion 12 through the digital interface 11. The encoding/decoding portion 12 arranges the asynchronous data into a predetermined data sequence. Since a re-transmitting operation is performed for the asynchronous data, an error correction code encoding process is not performed for the asynchronous data. Under the control of the transmission control managing portion 14, the transmission timing of the data is designated. In the time period of the asynchronous transmission area ASYNCA at the end of the frame, an output signal of the encoding/decoding portion 12 is supplied to the radio frequency transmission processing portion 13. The radio frequency transmission processing portion 13 modulates the signal in a predetermined modulating method, converts the resultant signal into a signal of a predetermined transmission frequency, amplifies the resultant signal in a desired power level, and transmits the resultant signal from the antenna 16.

When data is received, a signal that is received from the antenna 16 is supplied to the radio frequency transmission processing portion 13. The radio frequency processing portion 13 converts the reception signal into a signal of an intermediate frequency, and demodulates the resultant signal into a base band signal.

When information in the control area MA is received, in the time period of the control area MA, under the control of the transmission control managing portion 14, an output signal of the radio frequency transmission processing portion 13 is supplied to the encoding/decoding portion 12. The encoding/decoding portion 12 decodes the information in the control area MA. The information in the control area MA is supplied to the transmission control managing portion 14.

When a data stream is received, under the control of the transmission control managing portion 14, in the time period of a predetermined time slot in the stream packet transmission area, an output signal of the radio frequency transmission processing portion 13 is supplied to the encoding/decoding portion 12. The encoding/decoding portion 12 performs an error correcting process for the data stream transmitted with the predetermined time slots. An output signal of the encoding/decoding portion 12 is supplied to a predetermined unit through the digital interface 11.

As described above, in the system according to the present invention, the communication state change signal STATUS_REQ is placed in the control area MA at the beginning of each frame. With the communication state change signal STATUS_REQ, the high priority state of each node can be controlled.

In the above-described embodiment, the states of each wireless node are the normal state, the sleep state, and the high priority state. However, the high priority state may be sub-categorized. The sub-categorized states may be assigned as priority levels.

The length of one frame and the lengths of the stream transmission area and asynchronous transmission area are designated corresponding to transmission conditions. In this example, the asynchronous transmission area is preceded by the stream transmission area. However, the present invention is not limited to such an arrangement. Instead, the stream transmission area may be preceded by the asynchronous transmission area.

According to the present invention, a communication signal transmitted and received between each communicating station and the controlling station is structured as a frame that is divided into time periods of a control area and a data area. In the control area, a communicating station state signal that represents the priority level of the local communicating station and a communicating station state change request signal that causes the priority level thereof to be changed are placed. The control area and the data area are divided as time periods. The controlling station transmits the communicating station state signal to a communicating station. A communicating station transmits the communicating station status change request signal to the controlling station. Thus, the controlling station controls the access right of the communicating station corresponding to the priority level assigned thereto. Thus, in any case, the priority level can be securely assigned. Consequently, even if the communicating system gets congested, the priority level can be securely assigned.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A wireless communicating method of a system having a plurality of communicating stations and a controlling station for causing the plurality of communicating stations to be accessed, comprising the steps of:

transmitting a communication signal between each of the plurality of communicating stations and the controlling station, the communication signal being structured as a frame divided into a plurality of time periods forming a control area and a data area;

causing the controlling station to transmit a communicating station state signal to each of the plurality of communicating stations;

causing each of the plurality of communicating stations to transmit a communicating station state change request signal to the controlling station to update a priority level by using the control area of the frame, so that the controlling station controls an access right of each of the plurality of communicating stations corresponding to the priority level assigned to each of the plurality of communicating stations.

2. The wireless communicating method as set forth in claim 1, wherein the communicating station state signal represents the priority level of each of the plurality of communicating stations and is transmitted by the controlling station in the control area of the frame.

3. The wireless communicating method as set forth in claim 1, wherein the communicating station state change request signal causes each of the plurality of communicating stations to change the priority level assigned thereto.

4. A wireless communicating system, comprising:

a plurality of communicating stations; and a controlling station for causing the plurality of communicating stations to be accessed, wherein a communication signal is transmitted between each of the plurality of communicating stations and the controlling station, the communication signal being structured as a frame divided into a plurality of time periods forming a control area and a data area, the controlling station transmits a communicating station state signal to each of the plurality of communicating stations, and each of the plurality of communicating stations transmits a communicating station state change request signal to the controlling station to update a priority level by using the control area of the frame, so that the controlling station controls an access right of each of the plurality of communicating stations corresponding to the priority level assigned to each of the plurality of communicating stations.

5. The wireless communicating system as set forth in claim 4, wherein the communicating station state signal represents the priority level of each of the plurality of communicating stations and is transmitted by the controlling station in the control area of the frame.

6. The wireless communicating system as set forth in claim 4, wherein the communicating station state change request signal causes each of the plurality of communicating stations to change the priority level assigned thereto.

7. A communicating station of a wireless communicating system having a plurality of communicating stations and a controlling station for causing the plurality of communicating stations to be accessed, a communication signal being transmitted between each of the plurality of communicating stations and the controlling station and structured as a frame divided into a plurality of time periods forming a control area and a data area, the communicating station comprising:

communicating station state change request signal transmitting means for transmitting a communicating station state change request signal to update a priority level by using the control area of the frame for causing the priority level of each of the plurality of communicating stations to be changed; and communicating station state signal receiving means for receiving a communicating station state signal transmitted by the controlling station, wherein the priority level of each of the plurality of communicating stations is updated when each of the plurality of communicating stations transmits the communicating station state change request signal to the controlling station by using the control area of the frame, each of the plurality of communicating stations receives the communicating station state signal from the controlling station and each of the plurality of communicating stations acknowledges that the priority level has been updated.

8. The communicating station as set forth in claim 7, wherein the communicating station state signal represents the priority level of each of the plurality of communicating stations, and the communicating station state signal receiving means receives the communicating station state signal transmitted by the controlling station in the control area of the frame.

9. The communicating station as set forth in claim 7, wherein the communicating station state change request signal causes each of the plurality of communicating stations to change the priority level assigned thereto.

10. A controlling station of a wireless communicating system having a plurality of communicating stations for causing the plurality of communicating stations to be accessed, a communication signal being transmitted between each of the plurality of communicating stations and the controlling station and structured as a frame divided into a plurality of time periods forming a control area and a data area, the controlling station comprising:

communicating station state change request signal receiving means for receiving a communicating station state change request signal transmitted by each of the plurality of communicating stations to update a priority level by using the control area of the frame the communicating station state change request signal causing the priority level of each of the plurality of communicating stations to be changed;

communicating station state signal transmitting means for transmitting a communicating station state for causing a state of each of the plurality of communicating stations to be set corresponding to the communicating station state change request signal; and controlling means for controlling an access right corresponding to the priority level of each of the plurality of communicating stations, wherein after the controlling station receives the communicating station state change request signal from each of the plurality of communicating stations, the controlling station transmits the communicating station state signal corresponding to a requested priority level and changes the access right of each of the plurality of communicating stations corresponding to the requested priority level assigned thereto.

11. The controlling station as set forth in claim 10, wherein the communicating station state signal represents the priority level of each of the plurality of communicating stations, and the communicating station state signal transmitting means transmits the communicating station state signal to each of the plurality of communicating stations in the control area of the frame.

12. The controlling station as set forth in claim 10, wherein the communicating station state change request signal causes each of the plurality of communicating stations to change the priority level assigned thereto.

* * * * *